US012412176B2

(12) United States Patent
Kim

(10) Patent No.: US 12,412,176 B2
(45) Date of Patent: Sep. 9, 2025

(54) METHOD OF AUTOMATICALLY PROVIDING CRYPTOCURRENCY TO RECOMMENDER USING SNS PROPAGATION

(71) Applicant: Universal Group Co., Ltd., Gwangju (KR)

(72) Inventor: In Gi Kim, Gwangju (KR)

(*) Notice: Subject to any disclaimer, the term of this patent is extended or adjusted under 35 U.S.C. 154(b) by 333 days.

(21) Appl. No.: 17/737,592

(22) Filed: May 5, 2022

(65) Prior Publication Data

US 2022/0261810 A1 Aug. 18, 2022

Related U.S. Application Data

(63) Continuation-in-part of application No. 16/436,547, filed on Jun. 10, 2019, now abandoned.

(30) Foreign Application Priority Data

Mar. 4, 2019 (KR) .................. 10-2019-0024865

(51) Int. Cl.
*G06Q 20/40* (2012.01)
*G06Q 20/36* (2012.01)
(Continued)

(52) U.S. Cl.
CPC ..... *G06Q 20/4014* (2013.01); *G06Q 20/3678* (2013.01); *G06Q 20/389* (2013.01); *G06Q 50/01* (2013.01)

(58) Field of Classification Search
CPC .......... G06Q 20/4014; G06Q 20/3678; G06Q 20/389; G06Q 50/01; G06Q 20/065; G06Q 20/223; G06Q 30/0214
See application file for complete search history.

(56) References Cited

U.S. PATENT DOCUMENTS

2011/0276376 A1* 11/2011 Schmitt .................. G06Q 50/01
705/14.16
2014/0074655 A1* 3/2014 Lim ................... G06Q 20/3265
705/26.1
(Continued)

OTHER PUBLICATIONS

Andreas M. Antonopoulos, Mastering Bitcoin, Dec. 2014, O'Reilly (Year: 2014).*

(Continued)

*Primary Examiner* — Neha Patel
*Assistant Examiner* — Chunling Ding
(74) *Attorney, Agent, or Firm* — ANTONIO HA & U.S. PATENT, LLC

(57) ABSTRACT

A method for automatically providing a cryptocurrency to a recommender using social networking service (SNS) propagation includes an SNS friend recommending step, a new registration step, a reward rate determining step, a rewarding step, a transaction processing step, and a retransaction-based transaction processing step. The reward rate determining step includes the steps of determining a membership grade of a blockchain member recommended by the blockchain membership node according to the number of SNS friend IDs recommended and determining a reward rate for the blockchain member according to the determined membership grade. In the reward rate determining step, the membership grade of the recommended blockchain member rises as the number of the SNS friend IDs recommended by the blockchain membership node increases. When an SNS friend recommended by the blockchain membership node recommends another SNS friend, a weight is assigned to the membership grade of the blockchain member first recommended.

3 Claims, 6 Drawing Sheets

(51) Int. Cl.
*G06Q 20/38* (2012.01)
*G06Q 50/00* (2024.01)

(56) References Cited

U.S. PATENT DOCUMENTS

| | | | |
|---|---|---|---|
| 2016/0180386 A1* | 6/2016 | Konig | G06Q 30/0255 |
| | | | 705/14.55 |
| 2016/0224949 A1* | 8/2016 | Thomas | G06Q 20/027 |
| 2016/0342989 A1* | 11/2016 | Davis | H04L 9/50 |
| 2017/0005804 A1* | 1/2017 | Zinder | H04L 9/3239 |
| 2017/0046638 A1* | 2/2017 | Chan | H04N 5/913 |
| 2018/0349485 A1* | 12/2018 | Carlisle | G06F 16/9535 |
| 2019/0156363 A1* | 5/2019 | Postrel | H04L 67/566 |
| 2020/0019980 A1* | 1/2020 | Arora | G06Q 20/4016 |
| 2020/0250698 A1* | 8/2020 | Larimer | G06F 21/33 |
| 2020/0402091 A1* | 12/2020 | Ryu | G06Q 20/36 |

OTHER PUBLICATIONS

Andreas Antonopoulos, Mastering Bitcoin, 2014, O'Reilly Media, Inc. (Year: 2014).*

* cited by examiner

Fig. 5

| membership grade | Prover | Star | Planet | Galaxy | Universe |
|---|---|---|---|---|---|
| recommender | 1 | 10 | 50 | 250 | 1,000 |
| reward rate | 1coin | 3coins | 7coins | 10coins | 40coins |

METHOD OF AUTOMATICALLY PROVIDING CRYPTOCURRENCY TO RECOMMENDER USING SNS PROPAGATION

CROSS-REFERENCE TO RELATED APPLICATION(S)

This application is a continuation-in-part of U.S. patent application Ser. No. 16/436,547 filed on Jun. 10, 2019, which claims priority under 35 U.S.C. 119 to Korean Patent Application No. 10-2019-0024865, filed on Mar. 4, 2019, in the Korean Intellectual Property Office, the disclosures of which are herein incorporated by reference in their entireties.

TECHNICAL FIELD

Embodiments of the disclosure relate to methods for automatically providing cryptocurrencies, and more specifically, to methods for automatically providing cryptocurrencies to a recommender using SNS propagation.

DESCRIPTION OF RELATED ART

Cryptocurrencies are distributed and are created based on the technology of the blockchain which is a sort of distributed ledger.

A decentralized network may store and reference common information in the blockchain. In the blockchain, blocks are typically generated substantially simultaneously and each block commonly contains information units called transactions. Blocks in the blockchain are linked by inserting their hash values in fields designated in next subsequent blocks of the blockchain.

As a distributed database, the blockchain steadily updates transaction records, and by its design nature, has a tolerance to data modifications made by a particular node.

The blockchain imposes a consensus algorithm to store all updated data to the shared public ledger of each node. By doing so, each node may participate in the network with anonymity, connection failure, or insufficient reliability.

Further, the blockchain does not require any centralized database, and unlike conventional ledgers, such as ones recording all transactions of promissory notes, receipts, or checks, the blockchain may function as a platform for safe, transparent savings and transactions.

The blockchain is typically divided into two major classifications, public and non-public.

Public blockchains are fully open to the public to allow anyone to attend. By contrast, private blockchains are attendant-limited, distributed peer-to-peer networks to allow only ones who are invited to participate in the network.

Public blockchains have their known problems as follows. 1) They require a plenty of inputs to maintain the network which consists of a number of unspecified ones. 2) Shared information is made open over the entire network. 3) Processing time is very slow.

Conversely, since private blockchains automatically process real-time transactions over a safe network without massive computing performance, they may address the problems with public networks while proving the advantages of blockchain technology. However, private blockchains may be subject to reliability issues due to their centralized control system and consensus structure.

SUMMARY

According to an embodiment, there are provided a payment interface and blockchain platform that may support real-time transactions by accelerating transaction confirmation.

According to an embodiment, a method for automatically providing a cryptocurrency to a recommender using social networking service (SNS) propagation comprises an SNS friend recommending step in which a blockchain membership node registered, as a member, in a proof-of-expansion (PoX) blockchain platform server recommends an SNS friend identity (ID) of a member whose ID has been verified to the PoX blockchain platform server to protect information about a participant and a malicious attack, a new registration step in which the PoX blockchain platform server newly registers the SNS friend ID of the member as a blockchain membership node, a reward rate determining step in which the PoX blockchain platform server determines a reward rate for each blockchain member in association with the number of SNS friend IDs recommended by each blockchain membership node, a rewarding step in which the PoX blockchain platform server provides a cryptocurrency to each blockchain member according to the determined reward rate of each blockchain member, a transaction processing step in which, when a cryptocurrency transaction occurs between blockchain members recommended, the PoX blockchain platform server creates a transaction processing request transaction in a blockchain network processing server and store only information about friends associated with the transaction in a separate database to shorten a transaction confirmation time according to an occurrence of transaction between reliable friends, and a retransaction-based transaction processing step in which, when a cryptocurrency retransaction occurs between the same blockchain members recommended, the PoX blockchain platform server creates a retransaction processing request transaction in the blockchain network processing server.

The reward rate determining step includes the steps of determining a membership grade of a blockchain member recommended by the blockchain membership node according to the number of SNS friend IDs recommended and determining a reward rate for the blockchain member according to the determined membership grade.

In the reward rate determining step, the membership grade of the recommended blockchain member rises as the number of the SNS friend IDs recommended by the blockchain membership node increases.

When an SNS friend recommended by the blockchain membership node recommends another SNS friend, a weight is assigned to the membership grade of the blockchain member first recommended.

The transaction processing step may include receiving information about a plurality of nodes participating in verification of information about the created transaction from the blockchain network processing server, matching the information about the plurality of nodes with information about friends linked to the created transaction, and storing the matched information.

The retransaction-based transaction processing step may include a step in which the PoX blockchain platform server provides the stored information about the plurality of nodes matching the information about the friends to the blockchain network processing server, a step in which the blockchain network processing server enables a blockchain confirmation for the retransaction processing request transaction to occur in at least one among the plurality of nodes participating in the verification of the information about the prior transaction between the same blockchain membership nodes based on information about the plurality of nodes participating in the verification of the information about the prior transaction between the same blockchain membership nodes provided from the PoX blockchain platform server, and a step in which the PoX blockchain platform server provides a reward as per a preset reward rate to the at least one node having processed the retransaction processing request transaction.

In the transaction processing step, the PoX blockchain platform server may interwork with the blockchain network processing server to include a hash value of a particular block registered in the blockchain network processing server according to the prior cryptocurrency transaction through the blockchain membership nodes in a retransaction processing request transaction according to a cryptocurrency retransaction through the same blockchain membership nodes and create a blockchain confirmation.

Embodiments of the disclosure allow only SNS friends whose IDs have been verified to participate as guardians to recommend to other people to prevent malicious attacks and protect the participants' information and allow transactions to be made only for the ID verified SNS friends, thus making blockchain technology more reliable and building up and stabilizing blockchain interactions.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 5 is a view illustrating an example of determining a membership grade depending on the number of the identities (IDs) of recommending SNS friends according to an embodiment.

DETAILED DESCRIPTION OF EXEMPLARY EMBODIMENTS

Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. When determined to make the subject matter of the disclosure unclear, the detailed description of the known art or functions may be omitted.

Figure 1:
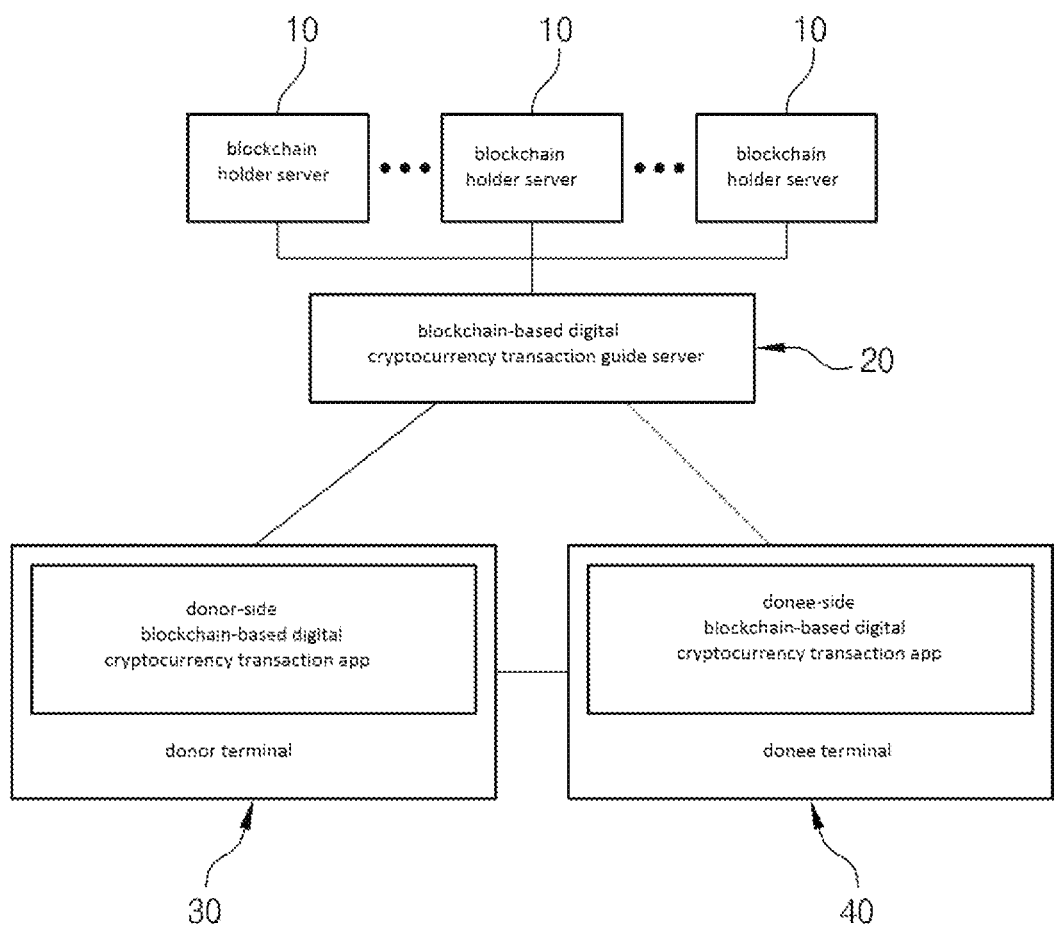
FIG. 1 is a view illustrating a normal cryptocurrency transaction system with an inter-party blockchain.
Figure 2:
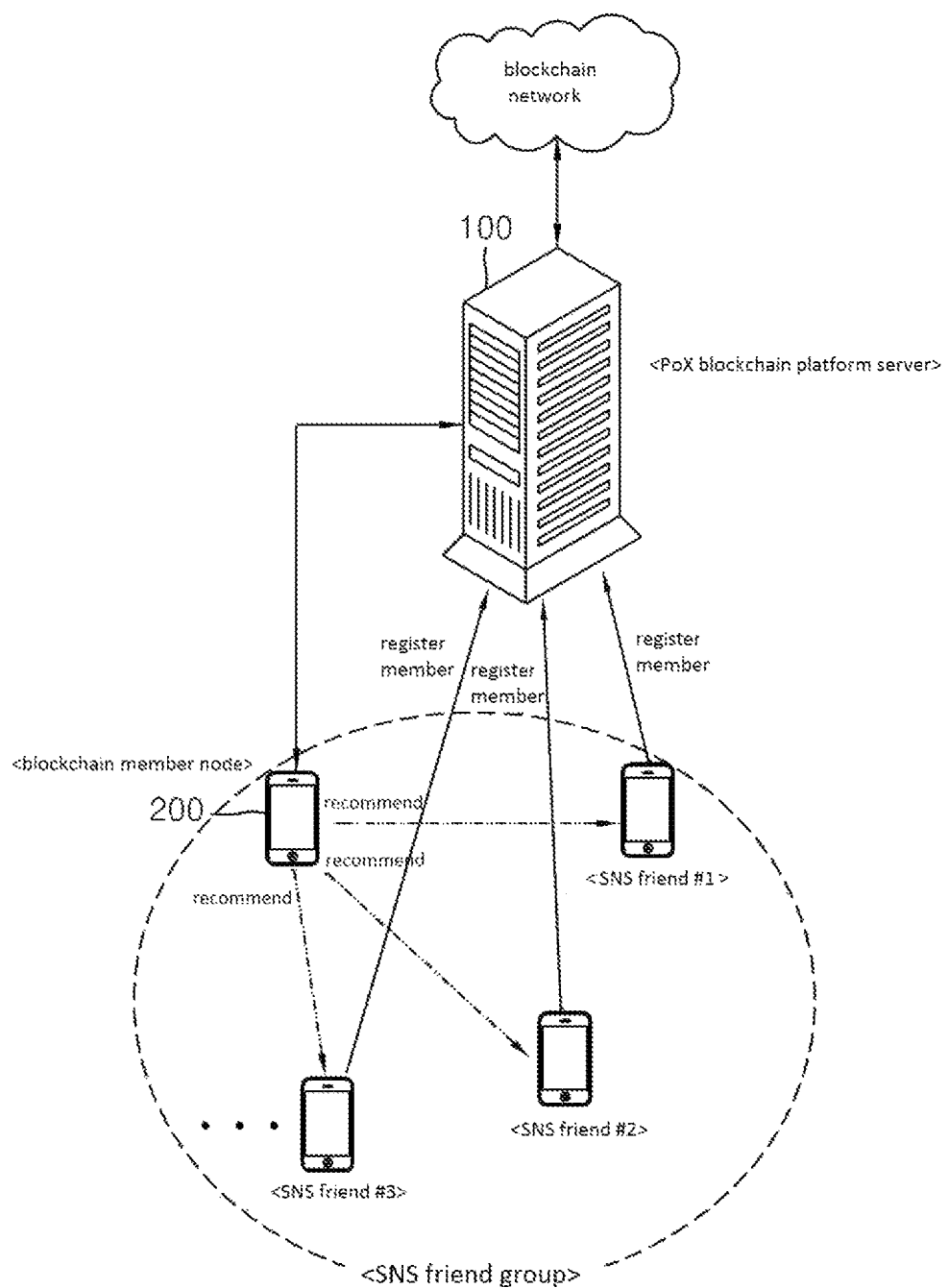
FIG. 2 is a view illustrating a configuration of a system for automatically providing a cryptocurrency to a recommender using an SNS propagation according to an embodiment.
Figure 3:
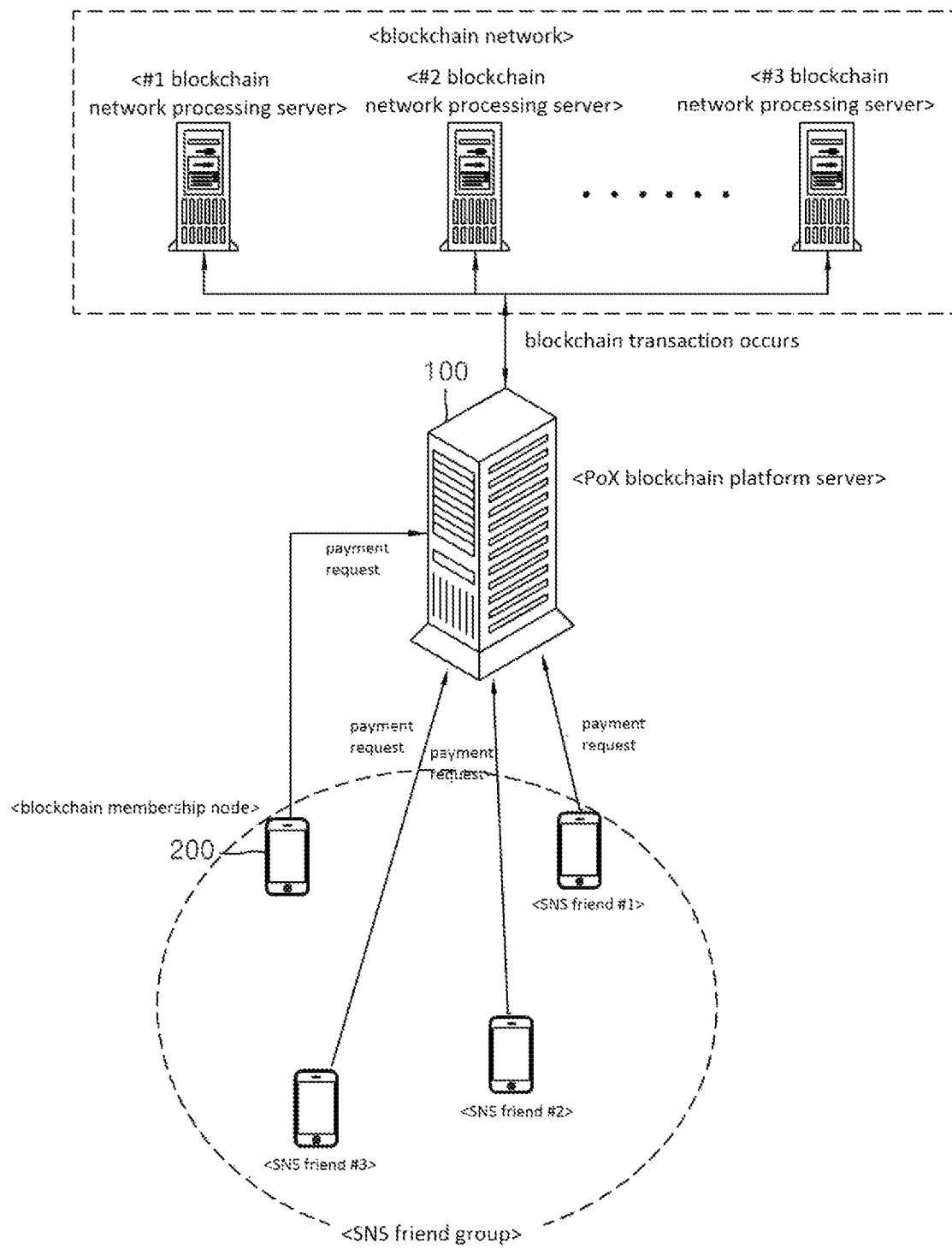
FIG. 3 is a view illustrating an example in which a transaction processing request transaction occurs in a blockchain network processing server.

FIG. 1 is a view illustrating a configuration of a cryptocurrency transaction system with an inter-party blockchain. FIG. 2 is a view illustrating a configuration of a system for automatically providing a cryptocurrency to a recommender using an SNS propagation according to an embodiment. FIG. 3 is a view illustrating an example in which a transaction processing request transaction occurs in a blockchain network processing server.

Prior to describing a system for automatically providing a cryptocurrency to a recommender (also referred to as a referrer) using an SNS propagation according to an embodiment, blockchain-based cryptocurrency technology is briefly described.

In describing cryptocurrency such as bitcoin, "mining" is a key word. Mining is a scheme of obtaining typically new cryptocurrencies. Mining refers to the process of providing a computer that first discovers, via competition, a computation value meeting a particular condition among computers (terminals) constituting a cryptocurrency network. Mining is not only a method for obtaining cryptocurrencies but also plays a role to authenticate cryptocurrency transaction.

Cryptocurrencies or virtual currencies have a common transaction ledger called a blockchain.

Briefly, a user downloads her cryptocurrency wallet program (or application) onto her computer. The user then installs the cryptocurrency wallet program or application (which may be simply referred to hereinafter as a "wallet") on her computer. Then, the user's computer runs the program (or application) and synchronizes (or matches) itself with a blockchain recorded in the network. Since the data size reaches a few tens of gigabytes, the sync would typically take about three days. After the sync is done, the user may create her own address (which is similar in concept to a bank account) on her wallet and may transmit or receive cryptocurrencies through the address. (The cryptocurrency address is a 34-digit word which is a combination of English capital/small letters and numbers, such as 1MowqQrQJL5AeaDMpX35B6EiJ4qnXPJnFp.

In all types of cryptocurrencies or virtual currencies driven on a blockchain system, the user end is constituted of a pair of keys formatted as 'private key-public key (address).' The public key and the private key, respectively, correspond to a bank account number and a user password, which match each other.

Referring to FIG. 1, a blockchain-based cryptocurrency transaction system may include a blockchain holder server 10, a cryptocurrency transaction guide server 20, a donor terminal 30, and a donee terminal 40.

There may be provided multiple blockchain holder servers 10. Upon receipt of blockchain-containing transaction information for digital cryptocurrency transactions, the blockchain holder servers 10 may be blockchain-equipped devices, and the blockchain holder servers 10 may verify the transaction information to thereby authenticate the blockchain-based digital cryptocurrency transactions and record the transaction information according to the authentication. The cryptocurrency holder servers 10 may be peer-to-peer (P2P) network-based distributed databases, i.e., devices constituting the cryptocurrency network, which may perform digital cryptocurrency transactions with blockchains by authenticating and recording the digital cryptocurrency transactions with blockchains.

The blockchain-based digital cryptocurrency transaction guide server 20 which is operated by a cryptocurrency exchange may be a member of the configuration of the blockchain holder servers 10.

The transmission of the blockchain-containing transaction information for cryptocurrency transactions (hereinafter, such blockchain-containing transaction information may simply be referred to as transaction information) may be defined in a communication protocol. When the transaction information occurs, one node (which may be a blockchain holder server) may propagate the transaction information to next eight designated nodes, and each of the eight nodes, which receive the transaction information, may also propagate the transaction information to next eight designated nodes. As such, the transaction information may be propagated to all of the nodes, i.e., blockchain holder servers 10, which have blockchains necessary to perform blockchain-containing digital cryptocurrency transactions.

Meanwhile, private blockchains may be subject to reliability issues due to their centralized control system and consensus structure.

According to an embodiment, a decentralized identity (DID) and SNS ID interaction both may be used. For example, profile information provided through SNS ID interaction, as a verifiable credential, may be included in the digital wallet (also referred to as an electronic wallet or e-wallet) of the user terminal (member node). Decentralized identity (DID) is a distributed identity configured to allow personal information to be managed by the individual user, rather than a centralized organization's or company's server and to, upon authentication of personal information, allow only necessary information to be provided. A DID document may include a public key and authentication information for verifying the control right or ownership of the DID. The user's personal information, e.g., such information (verifiable credentials) as name, age, address, or contact information, may be stored in the digital wallet of the user's terminal, and necessary information (verifiable credentials) may be provided during the authentication process. If an authenticated issuer identifies a signed DID by the user's claim, the authenticated user signs requested information with a private key, registers the public key with the user's DID document, and provides the issued claim to the user.

The user signs the issued claim with his private key, registers his public key with his DID document on blockchain and submits the claim to the verifier. The verifier is an entity that requests identification and may be an organization or institution that requests identification from the user for various reasons. The verifier enables identification through verification on the user's DID document distributed and stored on the blockchain.

According to an embodiment, there are provided a payment interface and blockchain platform that may enable and support real-time transactions by accelerating transaction confirmation.

According to an embodiment, referring to FIG. 2, a system for automatically providing a cryptocurrency to a recommender using social network service/site (SNS) propagation includes a PoX blockchain platform server 100. The PoX blockchain platform server 100 may have substantially the same configuration as a typical web server in terms of hardware and may be implemented in various programming languages, such as C, C++, Java, Visual Basic, or Visual C in terms of software while including programming modules that have various functions. The PoX blockchain platform server 100 may also be implemented with a server program which is provided in diverse manners depending on operating systems (OSs), such as Dos, Window, Linus, Unix, or Macintosh.

Indeed, the applicant of the invention has such cryptocurrency as developed TSL coil, Universal coin, or Unipay, and applied them to the platform according to the disclosure.

The term "proof of expansion (PoX)" as used herein may refer to a system in which a platform user, e.g., a recommender, forms a relationship as she is linked to the IDs of other SNS friends via her ID. As such process repeats, the platform may expand and provide a reasonable compensation to the user. The problems with prior cryptocurrency may be addressed in terms that benefits may be obtained depending on private capabilities.

To that end, according to an embodiment, in the system for automatically providing a cryptocurrency to a recommender using SNS propagation, if a blockchain member node 200 registered as a member in the PoX blockchain platform server 100 recommends the identity (ID) of the member's SNS friend to the PoX blockchain platform server 100, the PoX blockchain platform server 100 newly registers the ID of the member's SNS friend as a blockchain member node 200.

A process for registering a non-member node with the PoX blockchain platform server 100 to be a blockchain member node 200 is described. The PoX blockchain platform server 100 provides a separate webpage (also referred to as a signup page or a registration page) to the non-member node requesting to be registered as a member node (e.g., a blockchain member node 200) with the PoX blockchain platform server 100, (hereinafter, such non-member node is referred to as a requesting node). Providing the signup page may be performed by providing a link for signup (or registration) (such link is referred to as a signup link or a registration link) to the requesting node. The signup link may be recommended by an existing member node. If the requesting node visits the signup page, a user interface for SNS (i.e., a social media service) interaction signup is provided to the requesting node. The SNS for SNS interaction signup may include, but is not limited to Facebook, Kakao talk, and Twitter. If the requesting node selects a recommended SNS or another SNS which it desires to interact with, the requesting node undergoes a process for login authorization with the ID of the SNS through preset SNS API interaction. If the requesting authorizes login with the ID of the selected SNS, basic profile information, such as the ID or email of the SNS, or user name, is provided and automatically entered to the signup page according to the preset SNS API interaction, so that the SNS ID interaction process is complete.

Next, the requesting node creates a digital wallet for cryptocurrency transaction.

If a digital wallet is created, the requesting node completes signup for a DID service through a user interface provided by the PoX blockchain platform server 100 and adds the profile information, provided through the SNS ID interaction, as a verifiable credential, to his digital wallet.

The requesting node may be registered as a member node (i.e., a blockchain member node 200) through the above-described process, may identify a list of his friends through SNS interaction and select the ID of a friend from the list, and transmit invitation information including an invitation link to the friend on the SNS.

As shown in FIG. 2, each member node allows SNS friends, which it recommends, to have membership in the PoX blockchain platform server 100, thereby establishing an individual friend social network.

The PoX blockchain platform server 100 determines a reward rate for each blockchain member depending on the number of the IDS of SNS friends that each blockchain member node 200 recommends. When the compensation rate is determined the PoX blockchain platform server 100 rewards each blockchain member with cryptocurrencies as per the determined reward rate.

In rewarding each blockchain member with cryptocurrencies as per the determined reward rate, the PoX blockchain platform server 100 may determine the membership grade of the recommending blockchain member depending on the number of the SNS friend IDs that the blockchain member node recommends and may then determine the reward rate for the blockchain member depending on the determined membership grade.

The more SNS friend IDs as recommended by the blockchain member node are, the higher membership grade the recommending blockchain member may have.

Where a first SNS friend, who the blockchain member node recommends, recommends a second SNS friend, the membership grade of the blockchain member who recommended the first SNS friend may be given a weight.

Referring to FIG. 3, where a cryptocurrency transaction occurs between recommended blockchain members, the PoX blockchain platform server 100 creates a transaction processing request transaction in a blockchain network processing server.

The blockchain network processing server, upon receiving a blockchain sale confirmation request from the PoX blockchain platform server 100, propagates sale request information-based blockchain transactions to neighbor nodes to thereby complete sale confirmation (sale authentication and recording) and sends a sale confirm complete message to the PoX blockchain platform server 100. A bitcoin blockchain network processing server may exchange six confirmations with a neighbor node per blockchain transaction, thereby completing the transaction.

To that end, the blockchain network processing server may receive blockchain-containing transaction information for a cryptocurrency transaction (simply referred to as blockchain-containing transaction information) and authenticate the blockchain-based cryptocurrency transaction by verifying the blockchain-containing transaction information. The blockchain network processing server is equipped with a blockchain in which the blockchain-containing transaction information is recorded according to the authentication. There may be provided a plurality of blockchain network processing servers. The blockchain network processing servers may be devices constituting a P2P network-based decentralized blockchain network, which may perform blockchain-containing cryptocurrency transactions by confirming (authenticating and recording) blockchain-containing cryptocurrency transactions.

In blockchain payment, embodiments of the disclosure allows only SNS friends whose IDs have been verified to participate as guardians to recommend to other people to prevent malicious attacks and protect the participants' information and allow transactions to be made only for the ID verified SNS friends, thus making blockchain technology more reliable and building up and stabilizing blockchain interactions.

Figure 4:
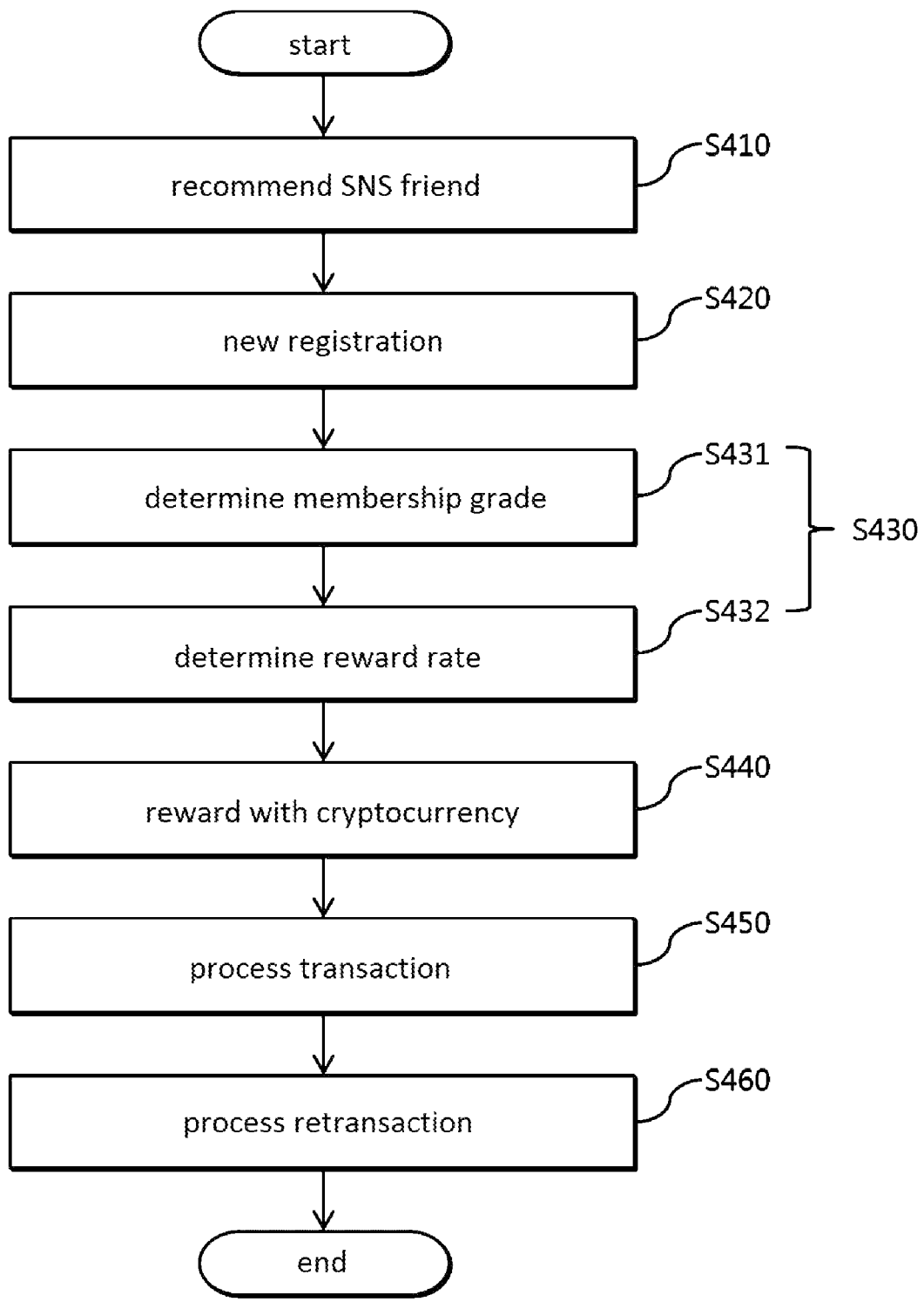
FIG. 4 is a flowchart illustrating a method for automatically providing a cryptocurrency to a recommender using SNS propagation according to an embodiment.
Figure 6:
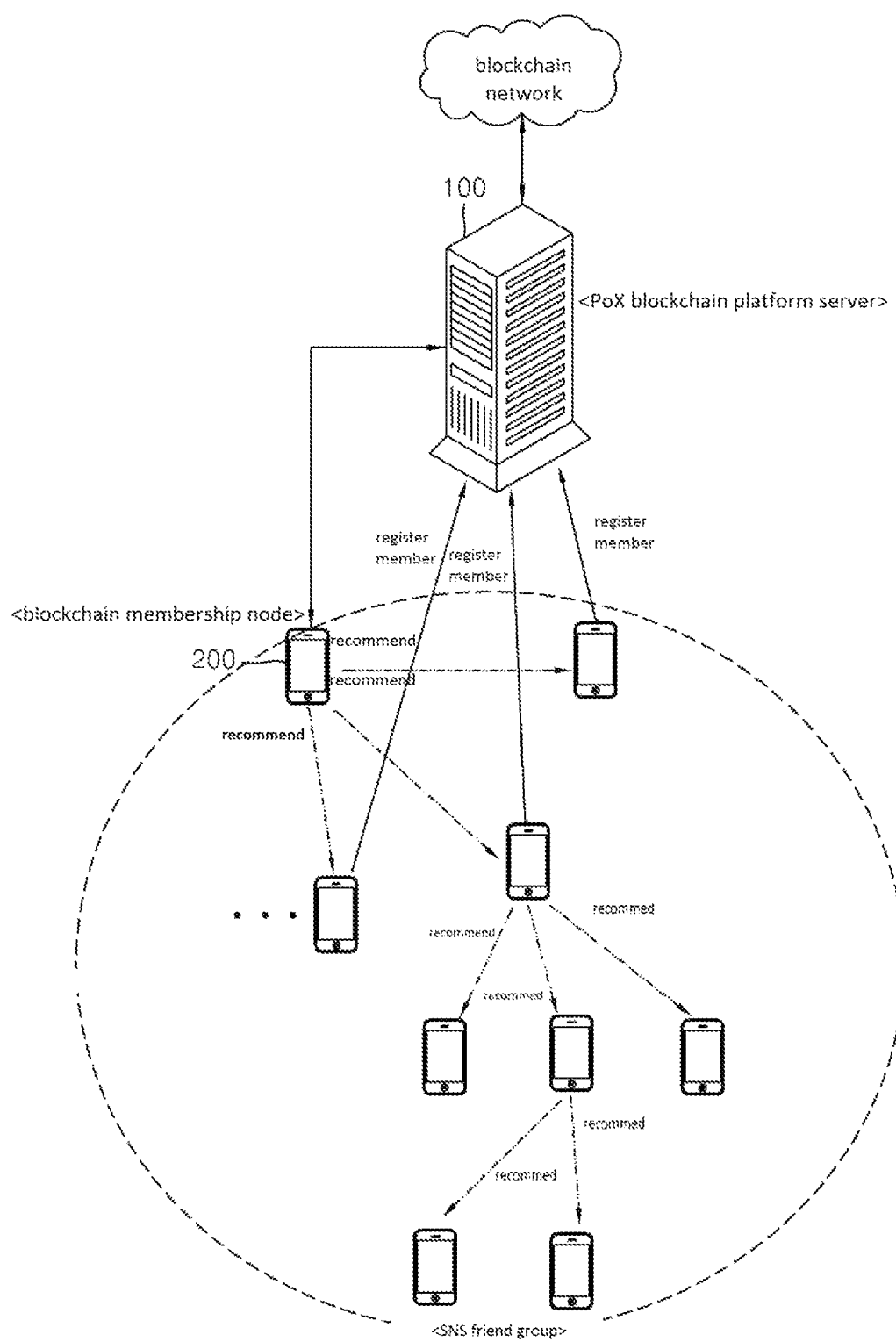
FIG. 6 is a view illustrating an example of performing multi-stage recommendation according to an embodiment.

FIG. 4 is a flowchart illustrating a method for automatically providing a cryptocurrency to a recommender using SNS propagation according to an embodiment. FIG. 5 is a view illustrating an example in which a membership grade is determined as per the number of SNS friend IDs recommended, according to an embodiment. FIG. 6 is a view illustrating an example in which multi-stage recommendation is performed according to an embodiment.

Referring to FIG. 4, a method for automatically providing a cryptocurrency to a recommender using SNS propagation may include a step S410 in which a blockchain membership node 200 registered as a member in the PoX blockchain platform server 100 recommends the ID of the member's SNS friend to the PoX blockchain platform server 100, a step S420 in which the PoX blockchain platform server 100 newly registers the ID of the member's SNS friend as a blockchain member node 200, and a step S430 in which the PoX blockchain platform server 100 determines a reward rate for each blockchain member depending on the number of SNS friend IDs that each blockchain membership node 200 recommends. The method may further include a cryptocurrency rewarding step S440, a transaction processing step S450, and a transaction processing step S460 according to retransaction. The method is described below in greater detail.

In step S410, the blockchain membership node 200 registered as a member in the PoX blockchain platform server 100 recommends the IDs of the member's SNS friends to the PoX blockchain platform server 100. The blockchain membership node 200 may be a terminal of the member registered in the PoX blockchain platform server 100. The blockchain membership node 200 may select the ID of an SNS friend provided thereto via SNS interaction by SNS API, and recommend the ID of the SNS friend.

In step S420, the PoX blockchain platform server 100 newly registers the IDs of the member's SNS friends as blockchain membership nodes 200.

Specifically, if an SNS friend (or SNS friend ID) is selected by an existing member (referred to as a referrer) (or existing member node), the PoX blockchain platform server 100 provides an invitation link to the friend of the selected SNS friend ID (hereinafter, simply 'recommendee') (technically, the link may be provided to the selected friend's node (i.e., a terminal). The recommendee receiving the invitation link visits the signup page via the invitation link and performs a signup (registration) process through the user interface of the signup page. If the recommendee selects the SNS where the referrer also has membership from a list of SNSs for interaction provided on the signup page, the recommendee accepts authorization for login with the ID of the selected SNS through preset SNS API interaction and, if then, basic information, e.g., the ID and email address or user name of the SNS, provided by SNS API interaction is automatically entered to the signup page, so that the SNS ID interaction process is done. Then, the recommendee performs DID service signup or DID authentication process depending on whether the recommendee is a member of the DID service. If DID signup or authentication is done, the recommendee adds the profile information, provided via his SNS ID interaction, to his own DID document. The recommendee may create his own digital wallet through a dedicated application separately provided (e.g., from the PoX blockchain platform server 100) or, if having an existing digital wallet, the recommendee may register the existing digital wallet (e.g., with the PoX blockchain platform server 100).

In step S430, the PoX blockchain platform server 100 determines a reward rate for each blockchain member in association with the number of SNS friend IDs that each blockchain membership node 200 recommends.

Step S430 may include the step S431 of determining a membership grade of the recommending blockchain member depending on the number of the SNS friend IDs that the blockchain membership node 200 recommends and the step S432 of determining the reward rate for the blockchain member depending on the determined membership grade.

In other words, the membership grade may be determined depending on how many SNS friends the member recommends. Referring to FIG. 5, as the number of SNS friend IDs recommended by the blockchain membership node 200 increases, the membership grade of the recommending member increases.

Where a first SNS friend recommended by the blockchain membership node 200 recommends a second SNS friend, a weight may be given to the membership grade of the member who recommended the first SNS friend. As such, the disclosure may be made in a multi-level implementation.

For example, as shown in FIG. 6, a first member recommends her SNS friend (referred to as a first SNS friend for ease of description) and the first SNS friend is registered in the PoX blockchain platform server 100. The first SNS friend recommends her SNS friend, which is referred to as a second SNS friend for ease of description, and the second SNS friend is registered in the PoX blockchain platform server 100. As such, multi-level membership registration may be rendered possible, and the first recommending blockchain member may be given a weight to her membership grade as a reward and hence a higher membership grade.

Where such multi-level registration is performed over several times, the weight for the first recommending blockchain member may increase, and such increase in the weight may be accelerated as more and more SNS friends are registered over multiple levels as members in the PoX blockchain platform server 100. Such multi-level membership enables a building-up of a reliable blockchain member family.

In step S440, the PoX blockchain platform server 100 provides cryptocurrencies to each blockchain member according to the determined reward rate. Such rewarding as per the reward rate may be performed by automatically providing cryptocurrencies to the blockchain membership node 200 who recommends a SNS friend.

In step S450, where a cryptocurrency transaction occurs between blockchain members recommended, the PoX blockchain platform server 100 creates a transaction processing request transaction in the blockchain network processing server as shown in FIG. 3. For example, upon receiving a request for payment using cryptocurrency from the blockchain membership node 200, the PoX blockchain platform server 100 allows a transaction processing request transaction to occur in the blockchain network processing server, thereby enabling a blockchain confirmation to occur.

The transmission of the blockchain-containing transaction information for cryptocurrency transactions (hereinafter, such blockchain-containing transaction information may simply be referred to as transaction information) may be defined in a communication protocol. When the transaction information occurs, one node (which may be a blockchain holder server) may propagate the transaction information to next eight designated nodes, and each of the eight nodes, which receive the transaction information, may also propagate the transaction information to next eight designated nodes. As such, the transaction information may be propagated to all of the nodes, i.e., blockchain holder servers 10, which have blockchains necessary to perform blockchain-containing digital cryptocurrency transactions.

As transactions occur between reliable friends or acquaintances, the transaction confirmation time may be reduced.

Generally, blockoff time and transaction confirmation time are closely related to each other. For example, since a successful cryptocurrency transaction is designed to undergo a six-step procedure (60 minutes), it may be nearly impossible to adopt cryptocurrency transactions for real-time payments or daily-life transactions. Some users attempt to modify or manipulate the six-step procedure to shorten the transaction time.

According to an embodiment, to ensure real-time payment and transactions, a super node and a transfer chain are implemented, enabling payment and a transaction in an international exchange to be successfully done within three seconds.

To shorten the transaction confirmation time, if a first transaction between reliable friends occurs and thus a transaction processing request transaction is created in the blockchain network processing server, and then the transaction is complete, then the PoX blockchain platform server 100 stores only information (including, e.g., personal information, payment information, and account information) about friends associated with the first transaction in a separate database (not shown). In this case, the PoX blockchain platform server 100 may receive information about a plurality of nodes having participated in the verification of information about the first transaction from the blockchain network processing server, match the received information with information about the friends linked to the first transaction, and the store the matched information.

The transaction processing process S460 according to retransaction may be a process in which, when a cryptocurrency retransaction is made between members of the same blockchain, the PoX blockchain platform server 100 produces a retransaction processing request transaction in the blockchain network processing server. For example, upon receiving, again, a request for payment using cryptocurrency from the same blockchain membership nodes 200 after the cryptocurrency transaction between the blockchain membership nodes, the PoX blockchain platform server 100 allows a retransaction processing request transaction to occur in the blockchain network processing server, thereby enabling a blockchain confirmation to occur.

In this case, the PoX blockchain platform server 100 may transmit (or transfer) a new retransaction processing request transaction based on transaction information authenticated according to the retransaction between the same blockchain membership nodes 200 to the blockchain network processing server.

Thus, for cryptocurrency transaction between friends certainly authenticated, the PoX blockchain platform server 100 may create a retransaction processing request transaction able to more quickly shorten transaction confirmation time.

Further, the PoX blockchain platform server 100 may provide the blockchain network processing server with the information about the plurality of nodes having participated in the verification of the information about the prior transaction which has been stored matched with the information about the friends linked with the prior transaction.

Further, the blockchain network processing server may be configured to create a blockchain confirmation of the retransaction processing request transaction in at least one of the plurality of nodes having participated in the verification of the information about the prior transaction between the same blockchain membership nodes 200 which has occurred based on the information about the plurality of nodes having participated in the verification of the information about the prior transaction between the same blockchain membership nodes 200 which is provided from the PoX blockchain platform server 100.

The PoX blockchain platform server 100 may provide a reward, as per a preset reward rate, to at least one of the plurality of nodes having participated in the verification of the information about the prior transaction between the same blockchain membership nodes 200 prior to processing the retransaction processing request transaction.

In other words, when a second controller transaction occurs between the same blockchain membership nodes 200 after the first controller transaction occurs between the same blockchain membership nodes 200, the PoX blockchain platform server 100 may provide a reward as per a preset reward rate (e.g., 0.1 coin), with at least one of the plurality of nodes having participated in the verification of the information about the prior transaction between the same blockchain membership nodes 200 which perform the creation of the blockchain confirmation for the retransaction processing request transaction according to the occurrence of the second cryptocurrency transaction. In a case where multiple cryptocurrency transactions occur between the same blockchain membership nodes 200, more reward (e.g., 0.1 coin for the second transaction, 0.3 coin for a third transaction, or 0.5 coin for a fifth transaction) may be provided to at least one node which performs creation of a blockchain confirmation for the retransaction processing request transactions corresponding to the multiple cryptocurrency transactions as the number of cryptocurrency transactions increases.

As such, in a case where transaction repetitively occurs between reliable friends, a request for verification may be sent to the node having participated in the verification of the prior transaction, thereby shortening transaction confirmation time.

In a case where a request for payment on cryptocurrency is made through the same blockchain membership nodes 200 after the prior cryptocurrency transaction occurs between the blockchain membership nodes, the PoX blockchain platform server 100 may be configured to interwork with the blockchain network processing server to include (or associate) the hash value of a particular block registered in the blockchain network processing server as per the prior cryptocurrency transaction on the blockchain membership nodes 200 in (with) the retransaction processing request transaction as per the cryptocurrency retransaction on the same blockchain membership nodes 200 and create a blockchain confirmation.

After the confirmation for the retransaction processing request transaction is normally performed, the blockchain network processing server may include the registered hash value of the particular block in information according to the retransaction and register the same in a new other particular block.

According to an embodiment, in a method for automatically providing a cryptocurrency to a recommender (also referred to as a referrer) using social networking service (SNS) propagation, a blockchain member node 200, as an existing member node 200, may recommend an identity (ID) of an SNS friend, verified through decentralized identity (DID) authentication, to a proof-of-expansion (PoX) blockchain platform server 100.

The PoX blockchain platform server 100 may include, in a digital wallet of a node 200 of the SNS friend, profile information provided through SNS application programming interface (API) interaction of the SNS friend ID if the SNS friend subscribes to (or signs up for) a DID authentication service and register the node 200 of the SNS friend as a new blockchain member node 200.

The PoX blockchain platform server 100 may determine a reward rate for each blockchain member in association with a number of SNS friend IDs recommended by each blockchain membership node 200. The PoX blockchain platform server 100 may provide a cryptocurrency to each blockchain member according to the determined reward rate of each blockchain member. When a cryptocurrency transaction occurs between blockchain members recommended, the PoX blockchain platform server 100 may create a transaction processing request transaction in a blockchain network processing server and store only information about friends associated with the cryptocurrency transaction in a separate database to shorten a transaction confirmation time according to an occurrence of the cryptocurrency transaction between reliable friends. When a cryptocurrency retransaction, which is a second cryptocurrency transaction after the cryptocurrency transaction, occurs between the same blockchain members recommended, the PoX blockchain platform server 100 may create a retransaction processing request transaction in the blockchain network processing server.

A membership grade of a blockchain member recommended by the blockchain membership node 200 may be determined according to the number of SNS friend IDs recommended. The reward rate for the blockchain member may be determined according to the determined membership grade. The membership grade of the recommended blockchain member may rise as the number of the SNS friend IDs recommended by the blockchain membership node 200 increases. When an SNS friend recommended by the blockchain membership node 200 recommends another SNS friend, a weight may be assigned to the membership grade of the blockchain member first recommended;

The PoX blockchain platform server 100 may receive information about a plurality of nodes 200 participating in verification of information about the created transaction from the blockchain network processing server, match the information about the plurality of nodes 200 with information about friends linked to the created transaction, and store the matched information. The PoX blockchain platform server 100 may provide the stored information about the plurality of nodes 200 matching the information about the friends to the blockchain network processing server. The blockchain network processing server may enable a blockchain confirmation for the retransaction processing request transaction to occur in at least one among the plurality of nodes 200 participating in the verification of the information about the cryptocurrency transaction between the same blockchain membership nodes 200 based on information about the plurality of nodes 200 participating in the verification of the information about the cryptocurrency transaction between the same blockchain membership nodes 200 provided from the PoX blockchain platform server 100. The PoX blockchain platform server 100 may provide a reward as per a preset reward rate to the at least one node 200 having processed the retransaction processing request transaction. The information about the friends linked to the transaction may include the profile information included in digital wallets of the friends.

The PoX blockchain platform server 100 may interwork (or interact) with the blockchain network processing server to include a hash value of a particular block registered in the blockchain network processing server according to the cryptocurrency transaction through the blockchain membership nodes 200 in a retransaction processing request transaction according to a cryptocurrency retransaction through the same blockchain membership nodes 200 and create a blockchain confirmation.

The PoX blockchain platform server 100 may provide a signup link to a signup page to the node 200 of the SNS friend and provide a user interface for SNS-interacting signup to the node 200 of the SNS friend if the node 200 of the SNS friend visits the signup page. The node 200 of the SNS friend may authorize login with an ID of a recommended SNS via preset SNS API interaction if the node 200 of the SNS friend selects the recommended SNS. The node 200 of the SNS friend may create a digital wallet for cryptocurrency transaction of the node 200 of the SNS friend. The PoX blockchain platform server 100 may provide a user interface for signup for the DID authentication service, and the node 200 of the SNS friend may sign up for the DID authentication service. Profile information provided through the preset SNS API interaction, as a verifiable credential, may be added to the digital wallet.

According to an embodiment, a method performed on a proof-of-expansion (PoX) blockchain platform server including a first database storing information about member nodes 200 and a second database different from the first data base may comprise recommending, by a first member node 200 among the member nodes 200, a social network service (SNS) friend whose identity has been verified through DID authentication; if the SNS friend subscribes a DID authentication service, including profile information provided via SNS API interaction of an ID of the SNS friend, in a digital wallet of a node 200 of the SNS friend and registering the SNS friend as a recommendee member node 200 and including the recommendee member node 200 in the member nodes 200, determining a reward rate for the first member node 200 and providing a cryptocurrency to the first member node 200 according to the reward rate; when a first cryptocurrency transaction occurs between recommendee member nodes 200, allowing at least one member node 200 of the member nodes 200 to verify the first cryptocurrency transaction; matching information about the recommendee member node 200 with the at least one member node 200 and storing the matched information; and when a second cryptocurrency transaction occurs between new members, allowing at least one of the at least one member node 200 to verify the second cryptocurrency transaction and providing a cryptocurrency to the at least one of the at least one member node 200.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A method for automatically providing a cryptocurrency to a recommender using social networking service (SNS) propagation, the method comprising:
recommending an identity (ID) of an SNS friend, verified through decentralized identity (DID) authentication, in a proof-of-expansion (PoX) blockchain platform server;
including, in a digital wallet of a node of the SNS friend, profile information provided through SNS application programming interface (API) interaction with the SNS that the SNS friend has registered in response to the SNS friend subscribing to a DID authentication service, and registering the node of the SNS friend as a blockchain member node;
determining a reward rate for each blockchain member in association with a number of SNS friend IDs recommended by each blockchain membership node of each blockchain member;
providing a cryptocurrency to each blockchain member according to the determined reward rate of each blockchain member;
in response to occurring of a cryptocurrency transaction between SNS friends, creating a transaction processing request transaction in a blockchain network processing server and then storing only profile information about the SNS friends associated with the cryptocurrency transaction in a separate database to shorten a transaction confirmation time according to an occurrence of a cryptocurrency transaction between reliable friends;
in response to occurring of a cryptocurrency retransaction, which is a second cryptocurrency transaction after the cryptocurrency transaction, between blockchain members recommended, creating a retransaction processing request transaction in the blockchain network processing server;
determining a membership grade of a blockchain member recommended by the blockchain membership node according to the number of SNS friend IDs recommended;
determining the reward rate for the blockchain member according to the determined membership grade, wherein the membership grade rises as the number of the SNS friend IDs recommended by the blockchain membership node increases, and wherein when an SNS friend recommended by the blockchain membership node of a first blockchain member recommends another SNS friend, a weight is assigned to the membership grade;
receiving information about a plurality of nodes participating in verification of information about the created transaction from the blockchain network processing server, matching the information about the plurality of nodes with the profile information about friends linked to the created transaction, and storing the matched information;
providing the stored information about the plurality of nodes, which is matched with the information about the friends from the PoX blockchain platform server to the blockchain network processing server;
confirming, by the blockchain network processing server, the retransaction processing request transaction to occur in at least one among a plurality of nodes participating in the verification of information about a cryptocurrency transaction between nodes of one blockchain membership based on information about the plurality of nodes participating in the verification of the information about the cryptocurrency transaction between nodes of one blockchain membership provided from the PoX blockchain platform server; and
providing a reward as per a preset reward rate from the PoX blockchain platform server to the at least one node having processed the retransaction processing request transaction, wherein the information about the friends linked to the transaction include the profile information included in digital wallets of the friends,
wherein the method further comprises:
providing a signup link to a signup page to the node of the SNS friend;
providing a user interface for SNS-interacting signup to the node of the SNS friend in response to the node of the SNS friend visiting the signup page;

authorizing login with an ID of a recommended SNS via preset SNS API interaction by selecting the recommended SNS by the node of the SNS friend;
creating the digital wallet for cryptocurrency transaction of the node of the SNS friend;
providing a user interface for signup for the DID authentication service;
signing up for the DID authentication service; and
adding the profile information provided through the preset SNS API interaction, as a verifiable credential, to the digital wallet,
wherein in response to a requesting node selecting a recommended SNS or another SNS which it desires to interact with, the requesting node undergoes a process for login authorization with an ID of the selected SNS through preset SNS API interaction, and
wherein in response to the requesting node authorizing login with the ID of the selected SNS, basic profile information, including the ID or an email of the selected SNS, or user name, is provided and automatically entered to the signup page according to the preset SNS API interaction, so that the SNS ID interaction process is complete.

2. The method of claim 1, wherein the PoX blockchain platform server interworks with the blockchain network processing server to include a hash value of a particular block registered in the blockchain network processing server according to a cryptocurrency transaction through blockchain membership nodes in the retransaction processing request transaction according to the cryptocurrency retransaction through the same blockchain membership nodes and create the confirming.

3. A method performed on a proof-of-expansion (PoX) blockchain platform server including a first database storing information about member nodes and a second database different from the first data base, the method comprising:
    recommending, by a first member node among the member nodes, a social network service (SNS) friend whose identity has been verified through DID authentication;
    in responses to the SNS friend subscribing a DID authentication service, including profile information provided via SNS API interaction of an ID of the SNS friend, in a digital wallet of a node of the SNS friend, registering the SNS friend as a recommendee member node, and including the recommendee member node in the member nodes;
    determining a reward rate for the first member node and providing a cryptocurrency to the first member node according to the reward rate;
    in response to occurring of a first cryptocurrency transaction between recommendee member nodes, allowing at least one member node of the member nodes to verify the first cryptocurrency transaction;
    matching information about the recommendee member node with the at least one member node and storing the matched information; and
    in response to occurring of a second cryptocurrency transaction between new members, allowing at least one of the member nodes to verify the second cryptocurrency transaction and providing a cryptocurrency to the at least one member node,
wherein the method further comprises:
providing a signup link to a signup page to the node of the SNS friend;
providing a user interface for SNS-interacting signup to the node of the SNS friend in response to the node of the SNS friend visiting the signup page;
authorizing login with an ID of a recommended SNS via preset SNS API interaction by selecting the recommended SNS by the node of the SNS friend;
creating the digital wallet for cryptocurrency transaction of the node of the SNS friend;
providing a user interface for signup for the DID authentication service;
signing up for the DID authentication service; and
adding the profile information provided through the preset SNS API interaction, as a verifiable credential, to the digital wallet,
wherein in response to a requesting node selecting a recommended SNS or another SNS which it desires to interact with, the requesting node undergoes a process for login authorization with an ID of the selected SNS through preset SNS API interaction, and
wherein in response to the requesting node authorizing login with the ID of the selected SNS, basic profile information, including the ID or an email of the selected SNS, or user name, is provided and automatically entered to the signup page according to the preset SNS API interaction, so that the SNS ID interaction process is complete.

* * * * *